US009180825B1

(12) United States Patent
Jones

(10) Patent No.: US 9,180,825 B1
(45) Date of Patent: Nov. 10, 2015

(54) VEHICLE DOOR PROTECTIVE CUSHION

(71) Applicant: Karen Jones, Santa Cruz, CA (US)

(72) Inventor: Karen Jones, Santa Cruz, CA (US)

(*) Notice: Subject to any disclaimer, the term of this patent is extended or adjusted under 35 U.S.C. 154(b) by 0 days.

(21) Appl. No.: 14/121,441

(22) Filed: Sep. 5, 2014

(51) Int. Cl.
E05F 7/00 (2006.01)
B60R 13/04 (2006.01)
E06B 7/28 (2006.01)

(52) U.S. Cl.
CPC ............. B60R 13/043 (2013.01); E06B 7/28 (2013.01)

(58) Field of Classification Search
CPC .................. B60R 13/043; E06B 7/28
USPC ........... 49/460, 462; 16/85, 86 R, 86 A, 404
See application file for complete search history.

(56) References Cited

U.S. PATENT DOCUMENTS

| 2,139,312 | A |   | 5/1937  | Mullens |
|---|---|---|---|---|
| 3,150,854 | A | * | 9/1964  | Jamieson .................. 248/345.1 |
| 3,260,491 | A | * | 7/1966  | Goode ....................... 248/345.1 |
| D231,430  | S | * | 4/1974  | Steinhauser ................... D8/382 |
| 4,072,231 | A | * | 2/1978  | Helms ........................... 206/453 |
| D260,590  | S | * | 9/1981  | Hobson ......................... D8/403 |
| 4,496,054 | A | * | 1/1985  | Koltun .......................... 206/586 |
| 4,801,018 | A | * | 1/1989  | Wilde ............................ 206/586 |
| D302,789  | S | * | 8/1989  | Levine .......................... D8/403 |
| 5,639,072 | A | * | 6/1997  | McCall ......................... 267/139 |
| 6,012,579 | A | * | 1/2000  | Tindoll et al. ................ 206/453 |
| 6,036,155 | A | * | 3/2000  | Tsui ........................... 248/345.1 |
| 6,368,694 | B1 | * | 4/2002 | Marsh et al. ................... 428/99 |
| 6,470,637 | B2 | * | 10/2002 | Gratz .......................... 52/287.1 |
| D489,969  | S | * | 5/2004  | Gelbart ......................... D8/403 |
| D499,674  | S | * | 12/2004 | Breckner et al. ............ D12/167 |
| 7,168,208 | B2 |   | 1/2007  | Ward |
| 7,828,151 | B2 | * | 11/2010 | Murdoch et al. ............. 206/586 |
| D656,007  | S | * | 3/2012  | Swoish et al. ................. D8/403 |
| 8,201,796 | B2 | * | 6/2012  | Belyea et al. .............. 248/345.1 |
| 8,376,166 | B2 | * | 2/2013  | Kindig et al. ................ 220/4.02 |
| D707,231  | S | * | 6/2014  | Sirichai ....................... D14/447 |
| 2002/0056656 | A1 | * | 5/2002 | Beliveau ....................... 206/453 |
| 2005/0050688 | A1 | * | 3/2005 | VanderWerf et al. ........... 16/404 |
| 2006/0243636 | A1 | * | 11/2006 | Robichaud et al. ......... 206/586 |
| 2007/0251855 | A1 | * | 11/2007 | Curnow et al. .............. 206/586 |

* cited by examiner

Primary Examiner — Jerry Redman
(74) Attorney, Agent, or Firm — Jeffrey A. Hall

(57) ABSTRACT

A moldable protective cushion for a vehicle door, having a central portion, a first end and a second end, and a receiving groove or aperture having a first moldable wall and a second moldable wall. The receiving groove or aperture being positioned in the central portion of the protective cushion, and extends along a first arm and a second arm of the cushion. The first and second arms are joined at a corner forming a protective cushion. The protective cushion is positioned and secured to a vehicle door by molding the first moldable wall and the second moldable wall to conform to a corner of the vehicle door.

18 Claims, 2 Drawing Sheets

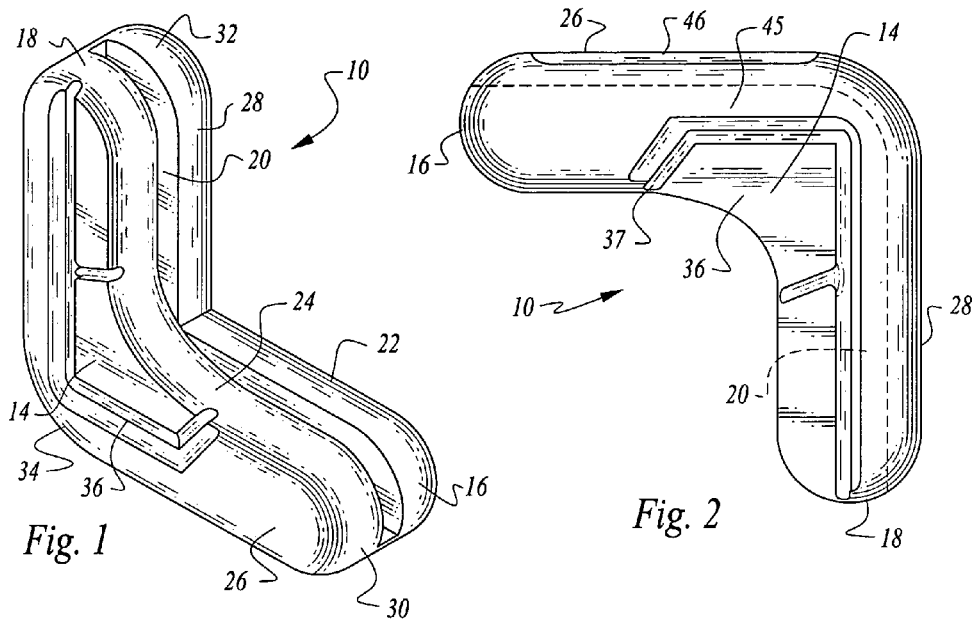
Fig. 1
Fig. 2
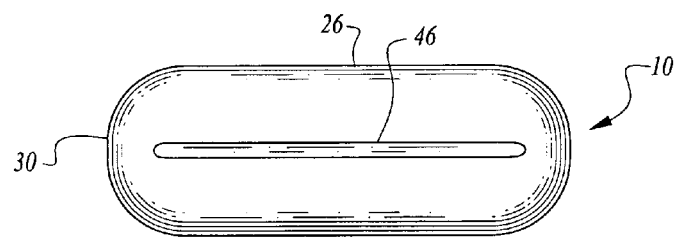
Fig. 3
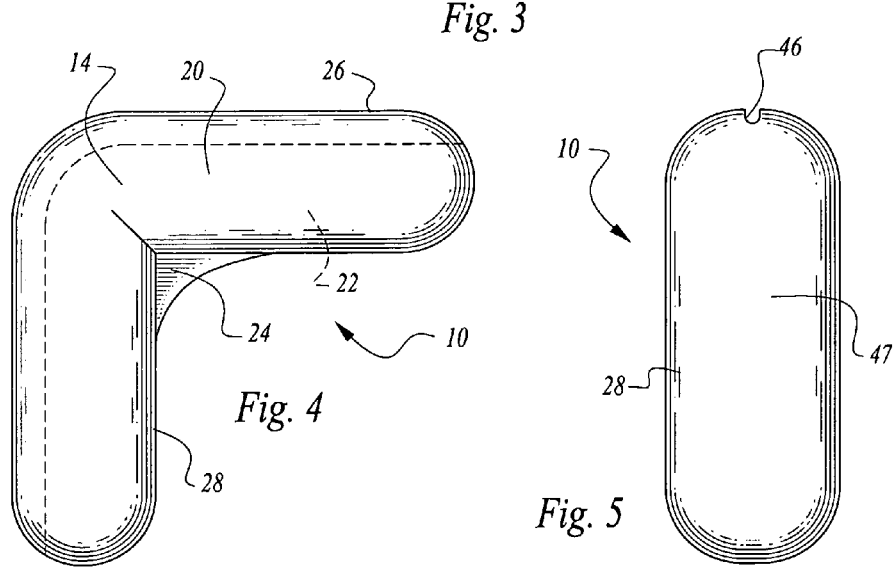
Fig. 4
Fig. 5

VEHICLE DOOR PROTECTIVE CUSHION

BACKGROUND OF THE INVENTION

1. Field of Invention

This invention relates generally to door cushions and guards and more particularly to a vehicle door protective cushion or guard that is detachably secured to the corner of a vehicle door to protect a passenger from injury from contact with the corner of the vehicle door and is moldable and impressionable so as to accommodate any vehicle door type.

2. Background Art

Various door cushions and guards have been proposed and implemented for both protecting the door or door edge and for protecting users from injury and harmful contact. Although prior devices have been adapted and used for various protective purposes, there exists a need for a vehicle door guard or cushion to protect a user from harmful contact with the door edge, which is easy to place or install on the door, is usable with any type of car or vehicle, is protective to the user and which is easily removed, if desired from the vehicle door.

In the past, there have been various devices proposed and implemented as vehicle or car door guards designed in the form of moldings of guards on the exterior or edge of a vehicle door. Such devices have primarily been designed to protect the vehicle door from damage from contact with objects. Such devices have been proposed as somewhat permanent additions to the vehicle or car, where the device is either screwed or bolted onto the door, or other permanent fastening means used such as adhesives.

There have also been proposed and implemented devices to protect the user of passenger of a vehicle from unwanted collision with the vehicle door when entering or exiting the vehicle. Again such devices have been flawed because they have been very cumbersome to install, and have been essentially permanent additions to the vehicle or car, where the device is either screwed or bolted onto the door, or other permanent fastening means used such as adhesives. Moreover, as there are a great variety of vehicles and car doors, such earlier devices have been greatly limited by being of a fixed form and not easily adaptable to a wide variety of vehicles.

As the edge of a vehicle door can pose a great a hazard to passengers and cause injury to those entering and exiting who may come in contact accidentally with the corners of the door, there is a need for a vehicle door guard or protective cushion which is easy to mold and install on any vehicle door, which provides protection to the passengers or other users of the vehicle, and which may easily be removed from the door if desired. The sharp corner of a vehicle door is a significant hazard to individuals entering or exiting a vehicle, and this risk is magnified for older individuals or for those with either a height or posture that results in their eye or face aligning with the sharp corner of the door. Aside from vehicles such as passenger cars, vehicles such as taxis, police cars, and passenger vans the abovementioned risk is magnified.

Accordingly a primary object of the present invention is to provide a vehicle protective cushion or guard that is easily positioned and secured to the corner of any vehicle door to protect the passenger or other user from injury from contact with the corner of the door.

It is a further object of the invention to provide a protective cushion or guard for vehicle doors which is moldable, impressionable, and easy configured for any vehicle door type or size, an which is easy to install, use, and remove, if desired from the vehicle door.

It is a further object of the invention to provide a vehicle door protective cushion or guard that does not interfere with the normal usage of the vehicle or sealing of the vehicle door, and may be provided in a variety of sizes, configurations, and styles.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purpose of the invention as embodied and broadly described herein, a moldable, impressionable protective cushion for a vehicle door is provided having a central portion, a first end and a second end, and a receiving groove or aperture having a first moldable wall and a second moldable wall. The receiving groove or aperture is positioned in the central portion of the protective cushion, and extends along a first arm and a second arm of the protective cushion. The first arm preferably having a substantially rounded end and the second arm preferably having a substantially rounded end. The first and second arms are joined at a corner forming a protective cushion or guard for the vehicle door or if desired may be used on a vehicle trunk as well. The protective cushion for vehicle doors is positioned and secured to a vehicle door by molding the first moldable wall and the second moldable wall of the protective cushion to conform to a corner of the vehicle door.

In one embodiment the moldable impressionable protective cushion for vehicle doors has a corner which joins the first arm and the second arm is expanded or bulbous in configuration.

The moldable impressionable protective cushion for vehicle doors may be composed of selected durable, resilient, moldable, and impressionable materials such as silicone, silicon rubber, agar or alginate, elastomers, polysufides. polyester, polyurethane, plastic, foam, or neoprene, for example.

The moldable impressionable protective cushion for vehicle may be provided where the central portion or arms are curved and colored to provide a color-coded indicator for ease of installation and for styles desired for a particular vehicle user.

BRIEF DESCRIPTION OF DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

FIG. 1 shows moldable, impressionable protective cushion for a vehicle door, according to the invention.

FIG. 2 shows a side view of the moldable, impressionable protective cushion for a vehicle door, according to the invention.

FIG. 3, shows top view of the first arm of the moldable, impressionable protective cushion for a vehicle door, according to the invention.

FIG. 4 shows a rear view of the moldable, impressionable protective cushion for a vehicle door the invention.

FIG. 5 shows a front view of the second arm of the moldable, impressionable protective cushion for a vehicle door, according to the invention.

DETAILED DESCRIPTION OF THE PREFERRED EMBODIMENT

Reference will now be made in detail to the present preferred embodiments of the invention as illustrated in the accompanying drawings.

In accordance with the present invention, there is provided in a preferred embodiment of the invention a moldable, impressionable protective cushion for a vehicle door, having a central portion, a first end and a second end, and a receiving groove or aperture having a first moldable wall and a second moldable wall. The receiving groove or aperture is preferably positioned in the central portion of the protective cushion, and extends along a first arm and a second arm of the protective cushion. The first arm preferably has a substantially rounded end, but may be otherwise, and the second arm having a substantially rounded end, but may be otherwise. The first and second arms are preferably joined at a corner thereby forming the protective cushion or guard. The protective cushion for vehicle doors of the present invention, is positioned and secured to a vehicle door by molding the first moldable wall and the second moldable wall of the protective cushion to conform to a corner of the vehicle door where it can protect vehicle passengers from injury from potential contact with the door corner. The moldable impressionable protective cushion for vehicle doors may be composed of selected durable, resilient, moldable and impressionable materials such as silicone, silicon rubber, agar or alginate, elastomers, polysufides. polyester, polyurethane, plastic, foam, or neoprene, for example.

Figure 6:
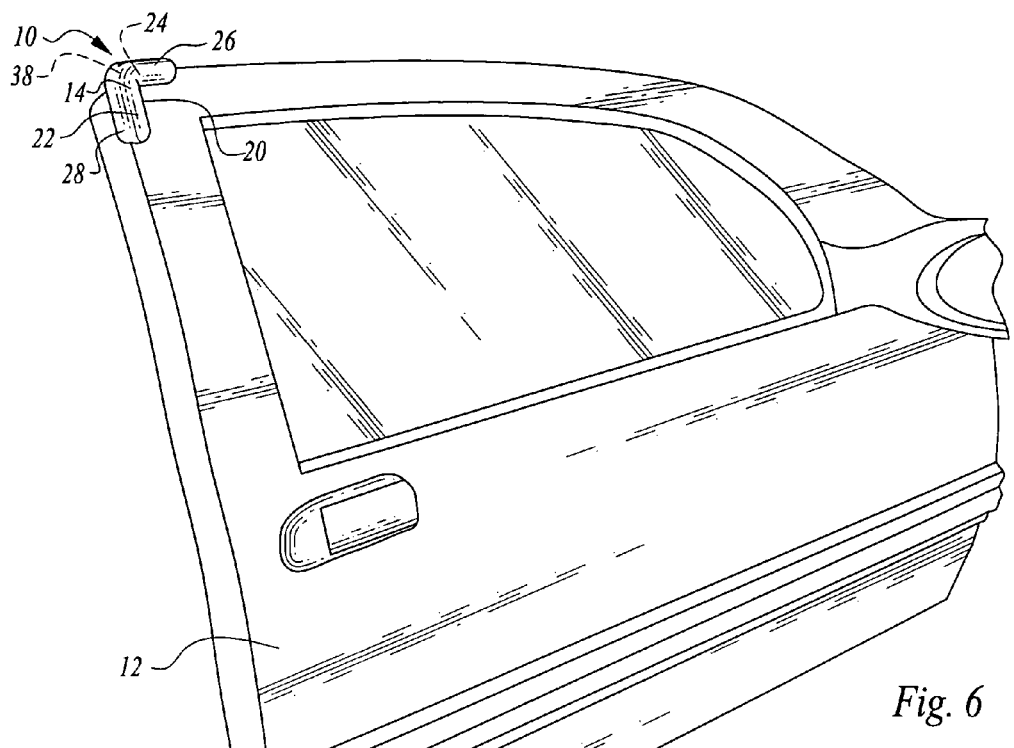
FIG. 6, shows a moldable, impressionable protective cushion for a vehicle door attached to a car door, according to the invention.

In FIG. 1, a preferred embodiment of the invention is shown, namely, a moldable, impressionable protective cushion 10, for a vehicle door 12, seen in FIG. 6, has a central portion 14, a first end 16, and a second end 18, and a receiving groove or aperture 20, having a first moldable wall 22, and a second moldable wall 24. The receiving groove or aperture 20, is preferably positioned in the central portion 14, of the protective cushion 10, and extends along a first arm 26, and a second arm 28, of the protective cushion 10. The first arm 26, preferably has a substantially rounded end 30, but may be otherwise, and the second arm 28, preferably having a substantially rounded end 32, but may be otherwise. The first and second arms are preferably joined at a corner 34. The protective cushion 10, for vehicle doors of the present invention, is positioned and secured to a vehicle door by molding the first moldable wall 22, and the second moldable wall 24, of the protective cushion to conform to a corner of the vehicle door so as to protect vehicle passengers from injury from potential contact with the door corner. An indented portion 36, may be included to indicate to a user and to facilitate where pressure can be applied to mold the first and second walls 22 and 24, to the corner of a vehicle door. The moldable impressionable protective cushion 10, for vehicle doors may be composed of selected durable, resilient, moldable, and impressionable materials such as silicone, silicon rubber, agar or alginate, elastomers, polysufides. polyester, polyurethane, plastic, rubber, foam, or neoprene, for example.

With reference now to FIG. 2, a side view of the moldable, impressionable protective cushion 10, is shown. In this embodiment, has central portion 14, first end 16, second end 18, receiving groove or aperture 20. In the embodiment shown in FIG. 2, an indented flat portion 36 delineated by slot 37 is shown. This is an optional feature, but is useful for indicating to the user where to add pressure to the first moldable wall 22, and the second moldable wall 24, so as to form fit the protective cushion 10, to a vehicle door. This is simply done by applying pressure in the region outlined by groove 37. Also seen in FIG. 2, is an optional groove 46, which, in this embodiment extends along the surface 45, of first arm 26, to aid in orientation of the protective cushion 10, but may be eliminated in other embodiments if desired.

Preferably, the moldable impressionable protective cushion 10, for vehicle doors may be composed of selected durable, resilient, moldable, and impressionable materials such as silicone, silicon rubber, agar or alginate, elastomers, polysufides, polyester, polyurethane, plastic, foam, or neoprene, for example, with polymerized siloxanes or polysiloxaners, and particularly silicone rubber being preferred.

Silicone rubbers are generally grouped into five different classes and may be selected therefrom; those having only methyl groups on the polymer chain (polydimethyl siloxanes); those having methyl and vinyl substitutions on the polymer chain; those having methyl and phenyl substitutions on the polymer chain; those having methyl, phenyl and vinyl substitutions on the polymer chain; and those having fluoro, methyl and vinyl substitutions on the polymer chain.

In one embodiment, the protective cushion 10, comprises a rubber of a hardness of about 8 to about 90 shore. In another embodiment, the hardness is from about 18 to about 50 shore, or alternatively about 30 to about 40 shore, or alternatively about 30 shore. The rubber can comprise silicone, polyurethane and the like. It is preferred that that rubber is not tin cured as this results in an unpleasant odor. Further, it is preferred that the protective cushion 10, comprise silicone rubber as it is know that such materials are exceptionally non-toxic.

Referring now to FIG. 3, a top view of first arm 26, is shown with optional groove 46, for aid in correctly orienting and positioning protective cushion 10. In other embodiments, groove 46 is eliminated.

In FIG. 4, a rear view of protective cushion 10, for vehicle doors is shown with first arm 26 and second arm 28, central portion 14, and grove or aperture 24, with first moldable wall 22, and second moldable wall 24, extending along first arm 26 and second arm 28.

Preferably, protective cushion 10, for vehicle doors may be provided in any size desired, however, a preferred size is approximately 1-2 inches in length and about ¼ to ½ inch in thickness. However, in alternative embodiments, the length may be increased or decreased, and the thickness either increased or decreased as desired. In the preferred embodiment, protective cushion 10, is substantially solid except for groove or aperture 20, providing a protective cushion to shield a passengers eye, face or other body part from injury from accidental contact with the corner or the vehicle door With reference now to FIG. 5, a front view of second arm 26, with front surface 47, which is preferably provided as a smooth surface but may be otherwise in alternative embodiments.

In FIG. 6, a vehicle door 12, is shown with door corner 38, with protective cushion 10, operably secured thereto. Door corner 38, is placed in receiving groove 20, with first moldable wall 22, and second moldable wall 24, molded to secure and hold protective cushion 10, in place, thereby providing a protective cushion to protect a passenger from injury form contact with the corner of the vehicle door. In FIG. 6, the door illustrated is a car door, however, as is readily apparent, protective cushion 10 may be used on any type of vehicle door, such as a truck door, ambulance door, taxi cab door, and the like. Further, the protective cushion 10, may be used as an over-all attachment type accessory, for example, it may be used on a vehicle trunk or hood to protect against accidental injury from contact therewith. In all cases, the device may be adapted by its moldable and impressionable aspects and configuration so as to be adaptable and useful for various vehicle types, vehicle doors, and vehicle openings such as trunks.

Figure 8:
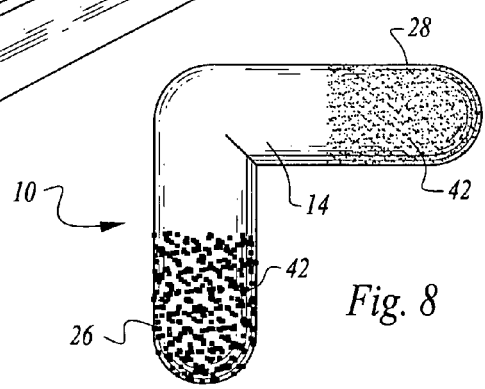
FIG. 8, shows another embodiment of a moldable, impressionable protective cushion for a vehicle door having and including color-coded regions, according to the invention.
Figure 7:
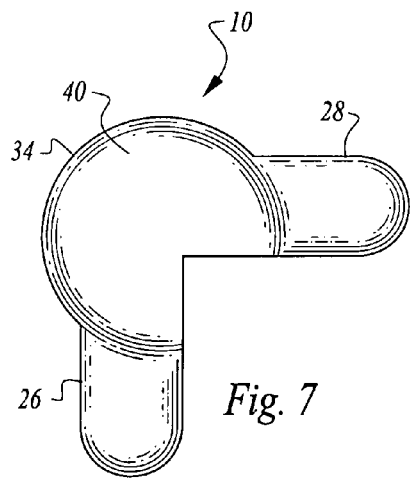
FIG. 7, shows another embodiment of a moldable, impressionable protective cushion for a vehicle door having an expanded or bulbous corner portion, according to the invention.
Figure 9:
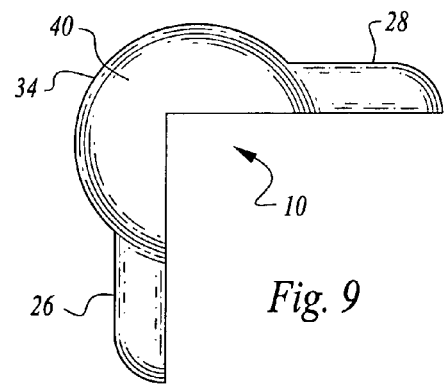
FIG. 9, shows another embodiment of a moldable, impressionable protective cushion for a vehicle door, according to the invention.

With reference to FIGS. 7, 8 and 9, different configurations of embodiments or vehicle protective cushion 10, are shown. In FIG. 7, the embodiment shown has corner 34, with an expanded or bulbous 40, configuration.

In FIG. 8, a more streamlined version of protective cushion 10, is shown where first arm 26, second arm 28, and central portion 14, are provided in thinner more streamlined configuration. Also seen in FIG. 8, is first arm 26, second arm 28, and central portion 14, being colored to provide a color-coded indicator 42.

Protective cushion 10, may be color-coded indicator 42, to allow the user to easily and logically position the cushion to a chosen surface. For example, protective cushion 10, may be provided in red, orange, green, violet, white, blue, light-blue, yellow, or the like, or any other chosen color and may be used to instruct the user as to the correct location and positioning the protective cushion. The chosen color may be provided by a pigment incorporated in liquid and applied to protective cushion 10, or other color application method. Or the entire protective cushion 10, may be colored by synthetic or natural means well known in the art. The liquid may be water or oil based or otherwise as desired, and the pigment may be natural or synthetic. Preferably, the pigment incorporated in the liquid is applied to first arm 26, and second arm 28, and central portion 14, and in some embodiments a different color pigment may be chosen for first arm 26 and second arm 28, or to the entire protective cushion 10. Or the protective cushion 10, may be colored by incorporating the color during the molding and manufacture process of protective cushion 10, and may be either partially or completely colored.

With reference now to FIG. 9, a modified version of the embodiment shown in FIG. 7, is shown, having corner 34, with an expanded or bulbous 40, configuration, however, being slightly less bulbous or expanded as the embodiment seen in FIG. 7, and where the first arm 26, and the second arm 28, are more elongated than the configuration shown in FIG. 7.

In operation and use, the moldable, impressionable protective cushion for vehicle doors 10, is very easy to use, efficient, and reliable, protecting a passenger or user from injury from contact with the corner of a vehicle door.

Protective cushion 10, may be used in cars, taxis, ambulances, trucks, and the like and may be used on other vehicle parts such as trunks if desired. It is inexpensive to manufacture and easy to use and very reliable. Protective cushion 10, may be provided in a variety of different sizes and configurations, and color-coded to provide locational and positional orientation. Protective cushion 10, is also quite helpful in that it protects a passenger or users eyes and face and other body parts from injury from the vehicle door. Preferably protective cushion 10, is composed of a durable, resilient, composed of selected durable, resilient, moldable and impressionable materials such as silicone, silicon rubber, agar or alginate, elastomers, polysufides. polyester, polyurethane, plastic, foam, or neoprene, for example. To use, for example, the user simply molds first moldable arm 26, and second moldable arm 28, to conform to the corner and edge of a vehicle door or trunk. AN impression of the corner and edge of the vehicle door is made so that the protective cushion 10, can be safely installed or removed from the vehicle door.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept

What is claimed is:

1. A moldable, impressionable protective cushion for a vehicle door, to protect vehicle passengers from injury from contact with the door corner, having a central portion, a first end and a second end, and a receiving groove or aperture having a first moldable wall and a second moldable wall, said receiving groove or aperture being positioned in said central portion of said protective cushion, and extends along a first arm and a second arm of said protective cushion; said first arm having a substantially rounded end and said second arm having a substantially rounded end; said first and second arms being joined at a corner, the protective cushion for vehicle doors is positioned and secured to said vehicle door by molding said first moldable wall and said second moldable wall of the protective cushion to conform to a corner of the vehicle door.

2. The moldable impressionable protective cushion for a vehicle door to protect vehicle passengers from injury from contact with the door corner of claim 1 wherein, said corner which joins said first arm and said second arm is bulbous in configuration.

3. The moldable impressionable protective cushion for a vehicle door to protect vehicle passengers from injury from contact with the door corner of claim 1, wherein said protective cushion is composed of a silicone.

4. The moldable impressionable protective cushion for a vehicle door to protect vehicle passengers from injury from contact with the door corner of claim 1, wherein said protective cushion is composed of a silicon rubber.

5. The moldable impressionable protective cushion for a vehicle door to protect vehicle passengers from injury from contact with the door corner of claim 1, wherein said protective cushion is composed of an agar or alginate.

6. The moldable impressionable protective cushion for a vehicle door to protect vehicle passengers from injury from contact with the door corner of claim 1, wherein said protective cushion is composed of an elastomer.

7. The moldable impressionable protective cushion for a vehicle door to protect vehicle passengers from injury from contact with the door corner of claim 1, wherein said protective cushion is composed of an polysufide.

8. The moldable impressionable protective cushion for a vehicle door to protect vehicle passengers from injury from contact with the door corner of claim 1, wherein said protective cushion is composed of a polyester.

9. The moldable impressionable protective cushion for a vehicle door to protect vehicle passengers from injury from contact with the door corner of claim 1, wherein said central portion is curved and a portion of the protective cushion colored to provide a color-coded indicator.

10. A moldable protective cushion for a corner of a vehicle door, having a central portion, a first end and a second end, and a receiving groove or aperture having a first moldable wall and a second moldable wall, said receiving groove or aperture being positioned in said central portion of said protective cushion, and extends forming a receiving slot for a corner of a vehicle door; the protective cushion for vehicle doors is positioned and secured to said vehicle door by molding said first moldable wall and said second moldable wall of the protective cushion to conform to a corner of the vehicle door.

11. The moldable protective cushion for a corner of a vehicle door of claim 10, wherein said corner which joins said first arm and said second arm is bulbous in configuration.

12. The moldable protective cushion for a corner of a vehicle door of claim 10, wherein said protective cushion is composed of a silicone.

13. The moldable protective cushion for a corner of a vehicle door of claim 10, wherein said protective cushion is composed of a silicon rubber.

14. The moldable protective cushion for a corner of a vehicle door of claim 10, wherein said protective cushion is composed of an agar or alginate.

15. The moldable protective cushion for a corner of a vehicle door of claim 10, wherein said protective cushion is composed of an elastomer.

16. The moldable protective cushion for a corner of a vehicle door of claim 10, wherein said protective cushion is composed of an polysufide.

17. The moldable protective cushion for a corner of a vehicle door of claim 10, wherein said protective cushion is composed of a polyester.

18. A moldable, single piece protective cushion for a vehicle door, to protect vehicle passengers from injury from contact with a door corner, having a central portion, a first end and a second end, and a receiving groove or aperture having a first moldable wall and a second moldable wall, said receiving groove or aperture being positioned in said central portion of said protective cushion, and extends forming a receiving slot for a corner of a vehicle door; the protective cushion for vehicle doors is positioned and secured to said vehicle door by molding said first moldable wall and said second moldable wall of the protective cushion to conform to a corner of the vehicle door; an indented flat area delineated by a slot is utilized for indicating to the user where to add pressure to the first moldable wall and the second moldable wall so as to form fit the protective cushion to the vehicle door, an optional groove extends along said first arm to facilitate placement of said protective cushion; and, the protective cushion being composed of a durable resilient, moldable and impressionable silicone.

* * * * *